(12) United States Patent
Helle et al.

(10) Patent No.: US 8,742,609 B2
(45) Date of Patent: Jun. 3, 2014

(54) POWER MANAGEMENT DURING GRID FAULTS

(75) Inventors: Lars Helle, Suldrup (DK); Thomas Hjort, Vejle Øst (DK); Thomas Lundgren Andersen, Hinnerup (DK)

(73) Assignee: Vestas Wind Systems A/S, Aarus N (DK)

( * ) Notice: Subject to any disclaimer, the term of this patent is extended or adjusted under 35 U.S.C. 154(b) by 635 days.

(21) Appl. No.: 12/827,706

(22) Filed: Jun. 30, 2010

(65) Prior Publication Data

US 2011/0025059 A1 Feb. 3, 2011

Related U.S. Application Data

(60) Provisional application No. 61/221,922, filed on Jun. 30, 2009.

(30) Foreign Application Priority Data

Jun. 30, 2009 (DK) .................................. 2009 70046

(51) Int. Cl.
*F03D 9/00* (2006.01)

(52) U.S. Cl.
USPC ......................................................... 290/44

(58) Field of Classification Search
USPC .................. 290/44, 55, 11, 18–19; 416/1, 39
See application file for complete search history.

(56) References Cited

U.S. PATENT DOCUMENTS

| | | | | |
|---|---|---|---|---|
| 6,512,966 | B2 * | 1/2003 | Lof et al. ....................... | 700/291 |
| 7,355,294 | B2 * | 4/2008 | Teichmann ..................... | 290/44 |
| 8,212,371 | B2 * | 7/2012 | Maibach et al. ................ | 290/44 |
| 2002/0087234 | A1 * | 7/2002 | Lof et al. ....................... | 700/286 |
| 2003/0151259 | A1 | 8/2003 | Andresen et al. | |
| 2007/0164567 | A1 | 7/2007 | Luetze et al. | |
| 2007/0267873 | A1 * | 11/2007 | Teichmann ..................... | 290/44 |
| 2007/0279815 | A1 | 12/2007 | Li et al. | |
| 2008/0150282 | A1 | 6/2008 | Rebsdorf et al. | |
| 2008/0277937 | A1 * | 11/2008 | Chuo .............................. | 290/44 |

FOREIGN PATENT DOCUMENTS

| | | |
|---|---|---|
| DE | 10105892 A1 | 9/2002 |
| WO | 2005078278 A1 | 9/2005 |

OTHER PUBLICATIONS

G. Joos, et al., Wind Turbine Generator Low Voltage Ride through Requirements and Solutions, *IEEE*, p. 1-7 (2008).
European Search Report, European Patent Office, Application No. 10165858.1 - 1807/12270331, dated Mar. 21, 2014.

* cited by examiner

*Primary Examiner* — Jean F Duverne
(74) *Attorney, Agent, or Firm* — Patterson & Sheridan, LLP

(57) ABSTRACT

A method for operating a wind turbine facility during for example a grid fault, the wind turbine facility comprising a power dissipation/storage being adapted to dissipate or store electrical energy exceeding an amount to be delivered to an associated power supply grid during the grid fault. The method includes operating the wind turbine facility in accordance with an allowed amount of electrical energy that can be dissipated or stored in the power dissipation/storage of the wind turbine facility by ensuring that a total amount of electrical energy generated by the wind turbine facility does not exceed a sum of the allowed amount and the amount to be delivered to the power supply grid.

25 Claims, 6 Drawing Sheets

POWER MANAGEMENT DURING GRID FAULTS

RELATED APPLICATIONS

This application claims priority from U.S. Provisional Patent Application Ser. No. 61/221,922 which was filed on Jun. 30, 2009 and Denmark Application No. PA 2009 70046 which was filed on Jun. 30, 2009

FIELD OF THE INVENTION

The present invention relates to a method and a system for determining a capacity of an electrical power reservoir. In particular, the present invention relates to a method and a system for such capacity determinations in periods following power grid related events, such as power grid failures.

BACKGROUND OF THE INVENTION

Various wind turbine related arrangements have been suggested in order to deal with so-called Low Voltage Ride Through (LVRT) events—cf. for example US 2007/0164567 and US 2007/0279815. The suggested arrangements are both full-scale power conversion arrangements where all the electrical power generated by a generator is passed through a generator side converter and a grid side inverter, the converter and the inverter being separated by an intermediate DC circuit.

During a LVRT event, the amount of power to be fed into a power supply grid has to be reduced due to the current ratings of the grid side inverter. Since sufficient energy can normally not be stored in the converter system, the power captured from the wind has to be reduced accordingly or, alternatively, the excess of power has to be dissipated. The latter solution has many advantages—e.g. the tear and wear on the mechanical parts of the wind turbine facility can be reduced significantly. Moreover, the wind turbine facility can be brought into power production very fast after the LVRT event has disappeared.

The power dissipating device has to be thermally designed for the desired amount of energy to be dissipated. Moreover, since the power dissipating device will require a relatively long time to cool down the number of successive low voltage events will also be a challenging design parameter.

SUMMARY OF THE INVENTION

The present invention relates to a control method and a wind turbine facility overcoming the above-mentioned design issue.

It may be seen as an object of embodiments of the present invention to provide a method and a system facilitating monitoring of a capacity of an available electrical power reservoir.

In particular, it may be seen as an object of embodiments of the present invention to provide a method and a system facilitating monitoring of a capacity of an available electrical power reservoir in periods following system faults or power grid related events, such as a power grid failure.

The above-mentioned objects are complied with by providing, in a first aspect, a wind turbine facility adapted to deliver electrical energy to an associated power supply grid, the wind turbine facility comprising generator means for converting mechanical energy to electrical energy, the generator means being mechanically coupled to a set of rotor blades optionally via a gearing arrangement, an electric power converter electrically coupled to the generator means and the associated power supply grid optionally via a grid transformer, power dissipation/storage means being adapted to dissipate or store an amount of electrical energy from the generator means, and control means for determining an allowed amount of electrical energy that can be dissipated or stored in the power dissipation/storage means.

Preferably, the wind turbine facility according to the present invention is capable of handling system break downs, such as converter break downs, and events relating power grid faults, such as LVRT events. Also, the wind turbine facility may be capable of performing emergency stops in an efficient manner.

The term wind turbine facility should be understood broadly. Thus, the term wind turbine facility may cover a single wind turbine or it may cover a group of wind turbines forming a wind power plant. Each wind turbine may be implemented as a full scale installation where essentially all power generated by the generator means is passed through the electric power converter. The generator means may be any suitable electric generator, such as for example a synchronous generator, an asynchronous generator or permanent magnet generator.

The electric power converter typically comprises a generator side converter operatively connected to a grid side inverter via an intermediate DC circuit. The grid side converter feeds electric power into the associated power grid, optionally through the grid transformer. The generator side converter and the grid side inverter may be implemented by applying traditional power converter techniques.

The electric power converter may comprise a plurality of parallel coupled power converter modules. Thus, the grid side converter and/or the generator converter may each comprise a plurality of parallel coupled power converter modules. In a multiphase wind turbine facility, such as a three phase system, power dissipation/storage means may advantageously be provided for each phase. Alternatively or in addition, the power dissipation/storage means may advantageously be operationally connected to the intermediate DC circuit. It should also be noted that a common power dissipation means may be operatively connected to for example a three phase generator means via a rectifier, such as a bridge rectifier or an inverter.

Each power dissipation/storage means may comprise a plurality of parallel coupled power dissipation elements and/or power storing elements. Thus, each power dissipation/storage means may comprise a plurality of parallel coupled power dissipation elements, a plurality of parallel coupled power storing elements, or a combination of parallel coupled power dissipation or power storing elements. In case the electric power converter comprises a plurality of parallel coupled power converter modules these power converter modules may be configured so that each converter module is operatively connected to its own power dissipation/storage means.

In one embodiment, the power dissipation/storage means, or at least a part thereof, may be electrically connected to the generator means via a controllable switch. A suitable controllable switch may be implemented as one or more IGBTs, one or more thyristors, one or more contactors etc.

In another embodiment, the power dissipation/storage means, or at least a part thereof, may be electrically connected to the intermediate DC circuit of the electric power converter via a controllable switch.

In a preferred embodiment of the present invention the power dissipation/storage means comprises a first part being electrically connected to the generator means via a first controllable switch, and a second part being electrically connected to an intermediate DC circuit of the electric power converter via a second controllable switch.

The power dissipation/storage means may comprise a dump resistor for dissipating electrical energy. Alternately, or in combination therewith, the power dissipation/storage means may comprise capacitive means, such as a capacitor bank, for storing electrical energy.

Electrical energy stored in the power storage means may be used for energising the wind power facility after stoppage. In this way power storage means can replace the traditional uninterruptible power supply (UPS) when the wind turbine facility is started up after stoppage.

The control means of the wind turbine facility may serve a plurality of purposes one of them being determination of the allowed amount of electrical energy that can be dissipated or stored in the power dissipation/storage means. In this respect the control means may be adapted to determine the allowed amount of electrical energy that can be dissipated or stored in the power dissipation/storage means on a regular basis or in response to specific events. Such specific events may be in time periods following a grid fault. However, the determination of the available amount of electrical capacity of the dissipation/storage may also be performed as a part of the operation of the wind turbine facility under normal working conditions.

The control means may be adapted to operate the wind turbine facility in response to the determined capacity of the power dissipation/storage means. Thus, the control means may be adapted to operate the wind turbine facility in such a manner that a total amount of electrical energy generated by the wind turbine facility does not exceed a sum of the allowed amount and the amount to be delivered to the power supply grid, for example during or immediately following a grid fault.

When the wind turbine facility is operated in a LVRT mode due to a detected grid fault the control means may control the total amount of electrical energy generated by the wind turbine facility by activating a pitching system of the wind turbine facility. Whether the control means activates the pitching system depends on the duration of the grid fault. As an example, if the duration of the grid fault exceeds 1 second the pitching system may be activated in such a way that the rotor blades are gradually pitched out of the wind after a period of approximately 5 seconds. Obviously, the LVRT ramp-down profile may vary from one wind turbine facility to another wind turbine facility. Thus, the ramp-down profile may differ from the before-mentioned 1 sec+5 sec profile.

The wind turbine facility may further comprise means for determining a temperature of the power dissipation/storage means. This may involve a temperature sensor.

In an embodiment of the present invention the control means may be adapted to determine the allowed amount of electrical energy that can be dissipated in the power dissipation means on the basis of the determined temperature of said power dissipation means.

Moreover, the control means may be adapted to determine the allowed amount of electrical energy that can be stored in the power storage means on the basis of a voltage across the power storage means.

In a second aspect, the present invention relates to a method for operating a wind turbine facility adapted to deliver electrical energy to an associated power supply grid during a grid fault, such as a low-voltage ride through event, the wind turbine facility comprising power dissipation/storage means being adapted to dissipate or store electrical energy exceeding an amount to be delivered to the associated power supply grid during the grid fault, the method comprising the step of operating the wind turbine facility in accordance with an allowed amount of electrical energy that can be dissipated or stored in the power dissipation/storage means of the wind turbine facility by ensuring that a total amount of electrical energy generated by the wind turbine facility does not exceed a sum of the allowed amount and the amount to be delivered to the power supply grid.

The method according to the second aspect is of particular interest in connection with grid faults in that the wind turbine facility is intended to remain connected to the power supply grid during such grid faults. Also, the method is of particular interest in time periods immediately following a grid fault.

Again, the term wind turbine facility should be understood broadly thus covering a single wind turbine or a group of wind turbines forming a wind power plant.

Generally, the wind turbine facility for carrying out the method of the second aspect of the present invention may be implemented as disclosed in connection with the first aspect of the present invention. Thus, each wind turbine may be implemented as a full scale installation. The wind turbine facility comprises a suitable electric generator, such as for example a synchronous generator, an asynchronous generator or permanent magnet generator. Moreover, the wind turbine facility comprises an electric power converter comprising a generator side converter operatively connected to a grid side inverter via an intermediate DC circuit. The grid side converter feeds electric power into the associated power grid, optionally through the grid transformer. The generator side converter and the grid side inverter may be implemented by applying traditional power converter technologies.

The allowed amount of electrical energy may be determined from a thermal capacity of the power dissipation means, or determined from a voltage across the power storage means. In an embodiment of the present invention the allowed amount of electrical energy that can be dissipated or stored in the power dissipation/storage means is determined on a regular basis. In another embodiment of the present invention the allowed amount of electrical energy that can be dissipated or stored in the power dissipation/storage means is determined in response to specific events, such as during grid faults or in periods following such grid faults. Thus, the method according to the present invention may be carried out during a grid fault, or in a time period immediately following a grid fault.

The method according to the second aspect may further comprise the step of applying electrical energy stored in the power storage means for energising a part of or parts of the wind turbine facility after stoppage of said wind turbine facility. Thus, electrical energy may be used for energizing the wind turbine facility after stoppage which may leave the traditional UPS superfluous.

In a third aspect the present invention relates to a method for operating a wind turbine facility adapted to deliver electrical energy to an associated power supply grid, the wind turbine facility comprising power dissipation/storage means being adapted to dissipate or store electrical energy, the method comprising the step of operating the wind turbine facility in accordance with an allowed amount of electrical energy that can be dissipated or stored in the power dissipation/storage means of the wind turbine facility by ensuring that a total amount of electrical energy generated by the wind turbine facility does not exceed the allowed amount of electrical energy.

Preferably, the method according to the third aspect of the present invention is capable of handling system break downs, such as converter break downs, and events relating to power grid faults, such as LVRT events. Also, the method may be able to perform emergency stops in an efficient manner.

Again, the allowed amount of electrical energy may be determined from a thermal capacity of a power dissipation element of the power dissipation/storage means.

The allowed amount of electrical energy that can be dissipated or stored in the power dissipation/storage means may be determined on a regular basis, or it may be determined in response to specific events, such as during grid faults or in periods following such grid faults, or in connection with for example converter faults.

The method according to the third aspect may further comprise the step of applying electrical energy stored in the power storage means for energising a part of or parts of the wind turbine facility after stoppage of said wind turbine facility. Thus, electrical energy may be used for energizing the wind turbine facility after stoppage which may leave the traditional UPS superfluous.

BRIEF DESCRIPTION OF THE DRAWINGS

The present invention will now be explained in further details with reference to the accompanying figures, where.

Figure 1:
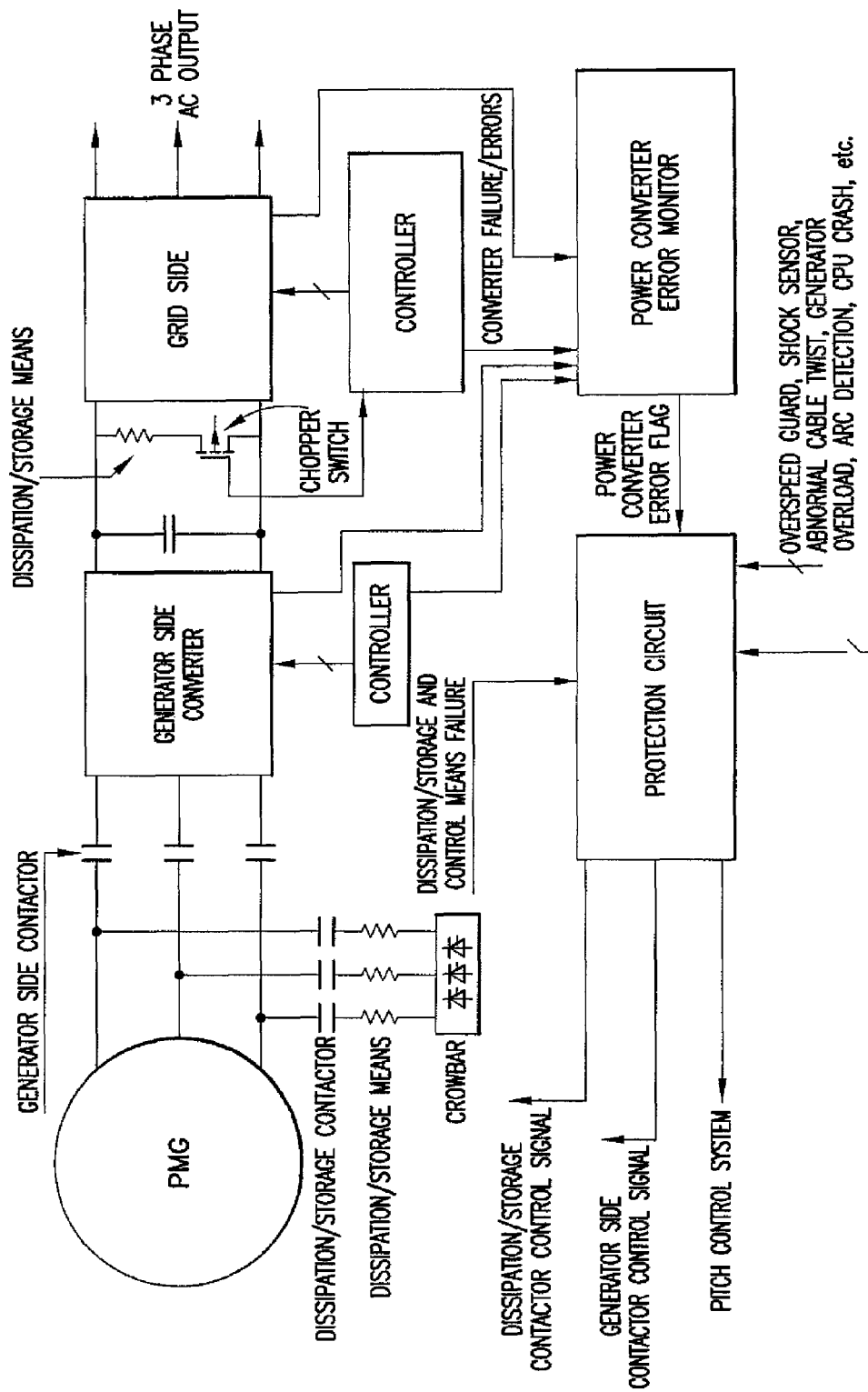
FIG. 1 shows the relevant parts of a wind turbine facility capable of carrying out the present invention.

While the invention is susceptible to various modifications and alternative forms, specific embodiments have been shown by way of examples in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE DRAWINGS

Generally, the present invention relates to a wind turbine facility and associated methods capable of handling for example LVRT events in power grid systems. Also, the wind turbine facility and the associated methods are capable of handling other types of faults, such as for example converter break downs, emergency stops or other types of electrical system faults.

During a LVRT event the wind turbine facility remains connected to the power grid. The fact that the wind turbine facility remains connected to the power grid during the grid fault may have a positive influence on the power grid in terms of stability, especially in connection with weak power grids. During the LVRT event the wind turbine facility remains operated at or near its nominal power level in order to reduce wear on the drive train of the wind turbine facility. However, if the duration of the grid fault is too long the wind turbine facility has to be ramped down in order not to overheat and thereby damage the power dissipation/storage elements handling power in access of the power to be delivered to the power grid during the LVRT event.

The following advantages are associated with the present invention:

1. Decreased tower loadings making it possible to reduce tower costs.
2. Less complex pitch strategy.
3. Increased energy capture.
4. Reduced converter costs.

As previously mentioned the wind turbine facility may for example be a single wind turbine or a group of wind turbines forming the wind energy plant. Each wind turbine may be implemented as a so-called full-scale power system where electrical power generated by a generator is passed through a generator side converter and a grid side inverter, the converter and the inverter being interconnected by an intermediate DC circuit.

The present invention aims at determining an allowed amount of electrical energy that can be dissipated or stored in power dissipation/storage means of a wind turbine facility. Power dissipation/storage means may be assigned to individual wind turbines or to a group of wind turbines forming the wind energy plant.

The allowed amount of electrical power can be determined continuously, at regular intervals or in response to predetermined events, the latter typically being in periods immediately following a LVRT event.

Power dissipation means typically involve one or more resistive elements whereas power storage means typically involve one or more capacitive elements. Optionally, resistive and capacitive elements may be combined. The power dissipation means and the power storage means are typically rated in such a way that the nominal power level from an associated generator can be dissipated/stored over a period of a few seconds.

As previously mentioned energy stored in the power storage means can be used to energies the wind turbine facility during a start up procedure after stoppage.

In one embodiment of the present invention the temperature of the power dissipation means is monitored, whereby the thermal capability in terms of energy of the power dissipation means may be calculated. Based on the required power ramp-down profile during a LVRT event, the maximum power level of the wind turbine facility can be calculated. The maximum power level is then used for setting a turbine power reference.

According to other embodiments of the present invention the capacity of the power dissipation/storage means can be determined from measurements of voltages and currents.

Thus, when the capacity of the power dissipation/storage means is known the wind turbine facility can advantageously be operated in accordance therewith. One strategy for operating the wind turbine facility is to ensure that the amount of generated power does not exceed a predetermined level, said predetermined level being equal to a sum of the capacity of the power dissipation/storage means and the amount to be fed into the power grid during a LVRT event.

Obviously, the predetermined level may vary over time. Also, the predetermined level may be influenced by other control parameters. For example, if the available capacity of the power dissipation/storage means is relatively low, the predetermined level can be set in accordance with the speed of the pitch control system. Thus, in case a low power capacity of the power dissipation means it can be advantageous to select an aggressive pitch control scheme offering a fast ramp-down profile.

The capacity of the power dissipation means will typically vary with the actual operating temperature. The closer the operating temperature is to the absolute temperature limit of the dissipation device the smaller the capacity. Moreover, the passive cooling effectiveness is dependent on the ambient temperature. Thus, the capacity of the dissipation means is higher at low temperatures.

Referring now to FIG. 1 a wind turbine facility suitable for carrying out the present invention is shown. As depicted in FIG. 1 the wind turbine facility involves a permanent magnet generator (PMG) operatively connected to a generator side converter via a set of controllable generator side contactors. It should be noted that the generator may as well be of a different type. The generator side contactors are controlled by a protection circuit.

A grid side inverter is operatively connected to the generator side converter via an intermediate DC circuit. Moreover, the grid side inverter is adapted to feed electric power to an associated power supply grid—optionally through a grid transformer (not shown). The generator side converter and the grid side inverter are controlled by respective controllers.

A first power dissipation/storage means being formed by a dump load resistor and/or some sort of storage means is operatively connected to the DC intermediate circuit. The amount of power to be delivered to the power dissipation/storage means is controlled by a conventional chopper in response to a control signal provided by the grid side inverter. The control signal to the chopper is generated in response to a measured DC voltage level of the intermediate DC circuit.

A second power dissipation/storage means being formed by a dump load resistor and/or some sort of storage means is operatively connected to the PMG via a set of controllable dissipation/storage contactors being controlled by the protection circuit. The amount of power to be delivered to the generator side power dissipation/storage means is controlled by a conventional crowbar. Preferably, the crowbar is implemented using IGBTs or thyristors.

The protection circuit monitors the operation of the wind turbine facility. Thus, if one of the two controllers, the inverter, the converter or the crowbar fail the protection circuit activates one or both of the power dissipation/storage means in order to bring the wind turbine facility to a stop. Moreover, the protection circuit may optionally activate the pitching system in order to stop the wind turbine facility effectively. In addition, the protection circuit may stop the wind turbine facility in response to an externally generated emergency stop signal or other types of input signals.

Figure 2:
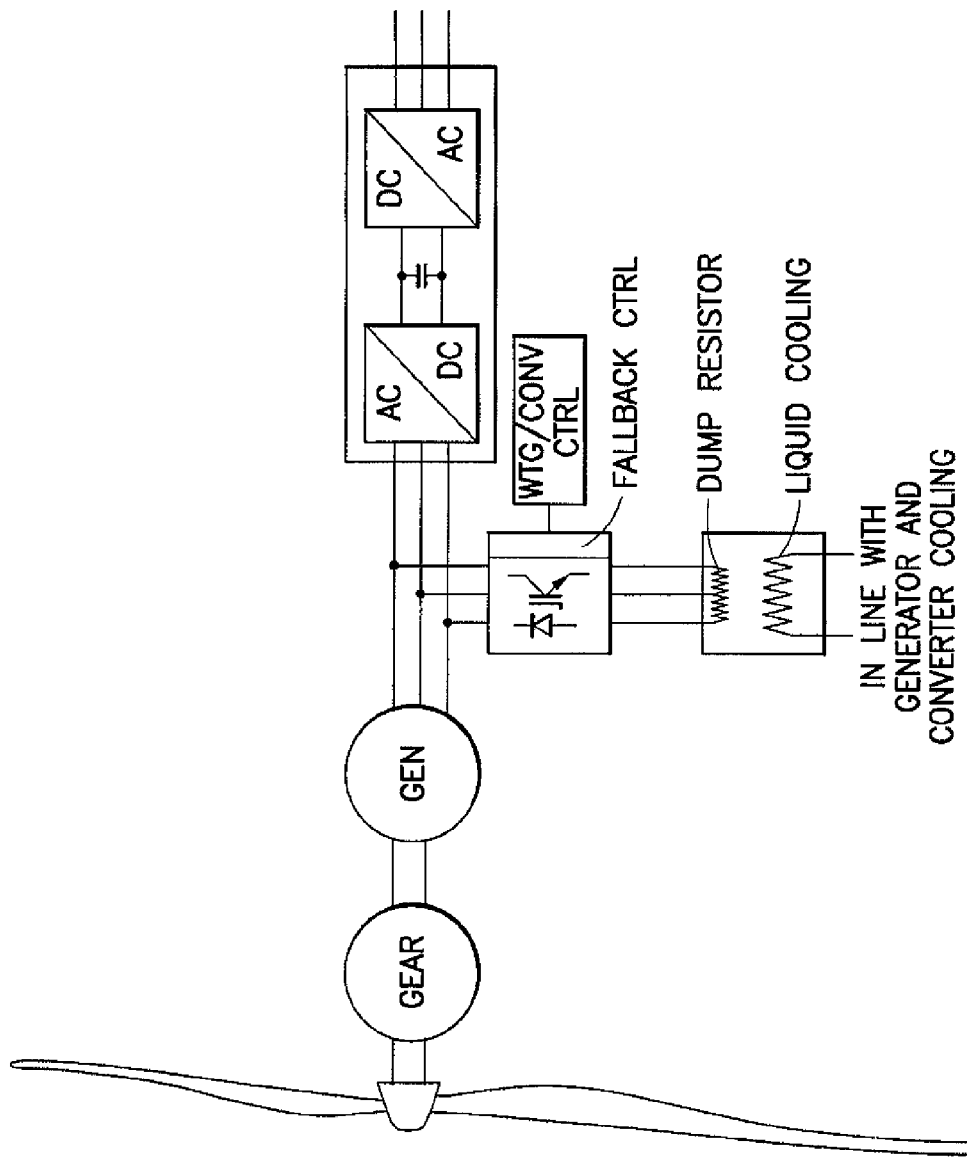
FIG. 2 shows a liquid cooled dump load.

Referring now to FIG. 2 a part of a wind turbine facility comprising a liquid cooled power dissipation/storage means in the form of a dump load resistor is depicted. The dump load resistor shown in FIG. 2 is operatively connected to the generator. It should be noted that the dump load resistor could be operatively connected to the intermediate DC circuit of the frequency converter instead. Alternative, a second dump load resistor could, in addition, be operatively connected to the intermediate DC circuit of the frequency converter.

Figure 3:
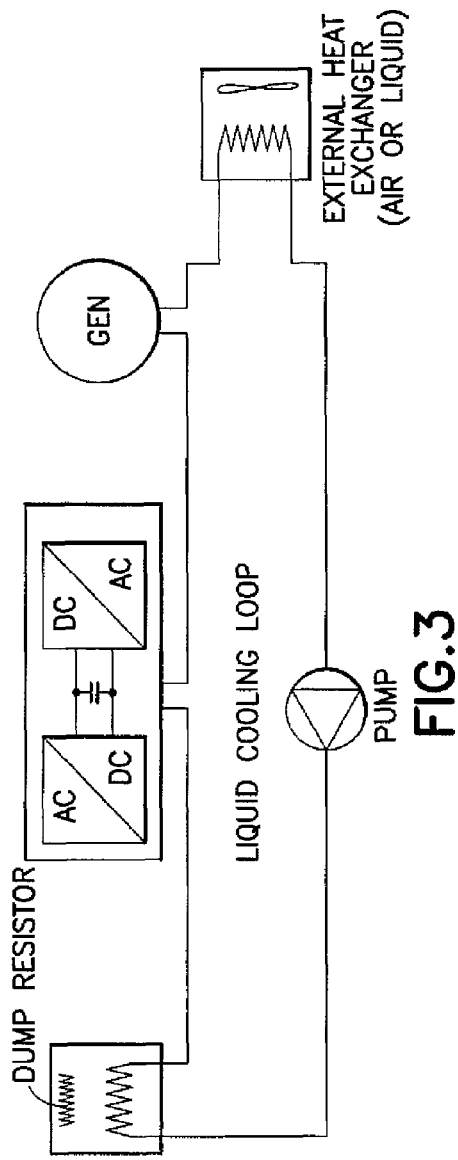
FIG. 3 shows a joint cooling system for a dump load and a frequency converter.

As seen in FIG. 2, the wind turbine facility comprises a set of rotor blades driving a generator (Gen) via a gearing arrangement (Gear). A full scale frequency converter comprising a AC/DC (generator side) converter and a DC/AC (grid side) inverter ensures that a correct frequency is fed into an associated power grid (not shown). The dump load resistor of the power dissipation means may be cooled with liquid optionally also cooling the generator and/or the frequency converter. Thus, the generator, the frequency converter and the power dissipation/storage means may optionally share the same cooling system. It should be noted that the power dissipation/storage means can be implemented with a storage element as well—either as a combined power dissipation/storage means or as a pure power storage means only including one or more storage elements. A controllable crowbar receiving its control signal from a wind turbine generator (WTG) converter controller (cony CTRL) controls the amount of power supplied to the dump load controller. Moreover, the crowbar will autonomously activate in the case of loss of signals or communication to the control systems normally controlling the activation of the system. A common cooling system for cooling for both the generator, the frequency converter and the power dissipation means, again shown as a dump load resistor, is depicted in FIG. 3. A pump drives the liquid coolant through the before-mentioned wind turbine elements and an external heat exchanger optionally including a fan for cooling the coolant.

FIG. 4 shows various ways of using the power dissipation/storage means. None of the shown examples in FIG. 4 relate to LVRT events. The overall functionality of the power dissipation means is to reduce the dynamic loads on the mechanical rotating system of the wind turbine facility. The description in relation to FIG. 4 is given with reference to the power dissipation/storage means being a dump load resistor. Alternatively, it can be implemented as a combined power dissipation/storage means comprising both power dissipating element(s) and power storage element(s), or as a pure power storage means only including one or more storage elements.

Figure 4A:
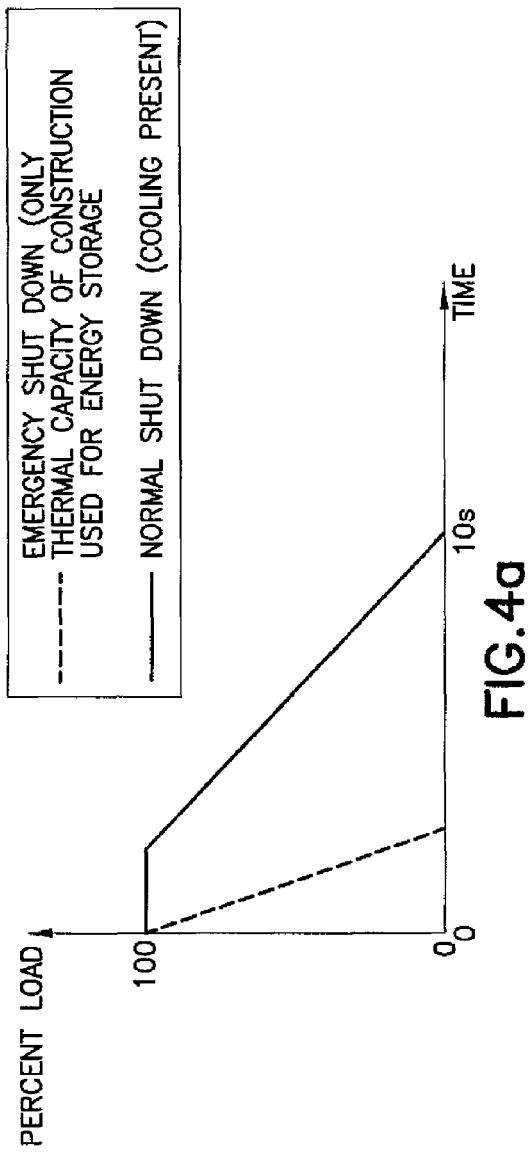
FIG. 4 illustrates various mode of operation using the advantages of a dump load.

FIG. 4a shows a shut down using a liquid cooled dump load resistor. In particular, FIG. 4a shows a shut down where the coolant is available during normal shut down procedures, but absent in emergency situations.

Figure 4B:
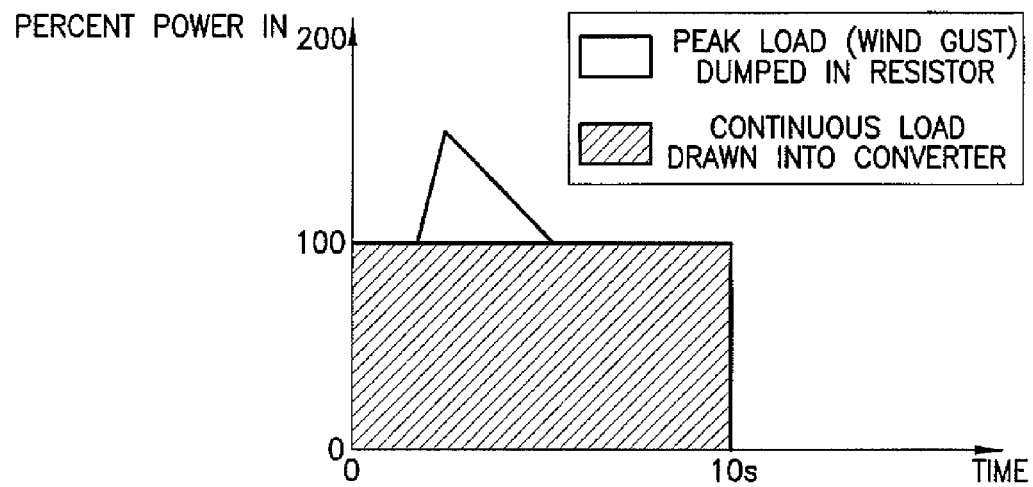
Figure 4C:
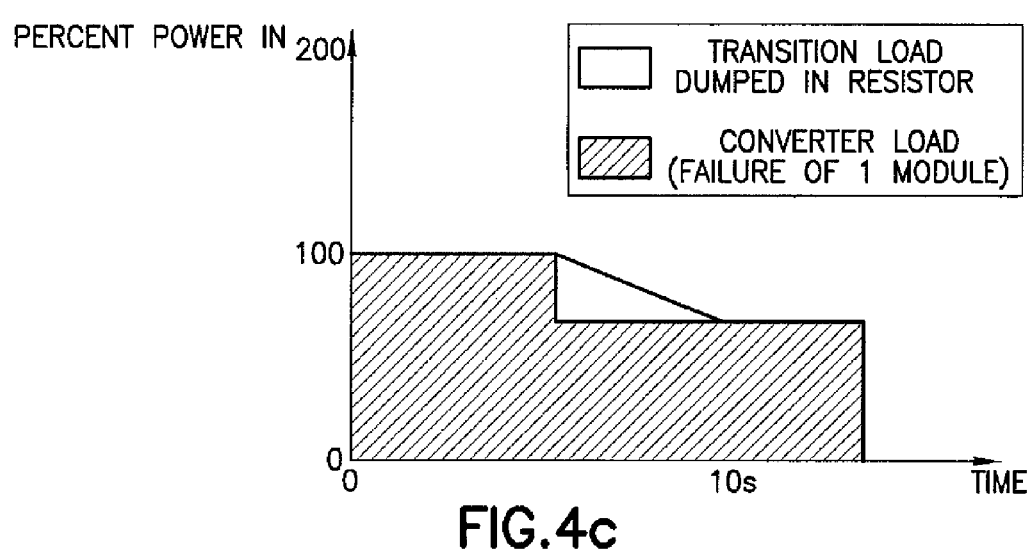

Referring to FIG. 4b a controlled dump load resistor, operatively connected to the generator or operatively connected to the intermediate DC circuit of the frequency converter, can absorb peak power levels generated by for example wind gusts while nominal power is provided to the frequency converter. Similarly, cf. FIG. 4c, if the load provided by the frequency converter unintentionally drops to a lower, but otherwise uncritically level, the dump load resistor can function as a transition load thereby reducing the loads on the mechanical parts of the wind turbine facility. This can be seen as a method to slow down the dynamics of the electrical system so as to fit the mechanical system. As indicated in FIG. 4c the unintentionally reduced load of the frequency converter may originate from a phase module failure within the converter. However, the load reduction may also be caused by other reasons.

Figure 5A:
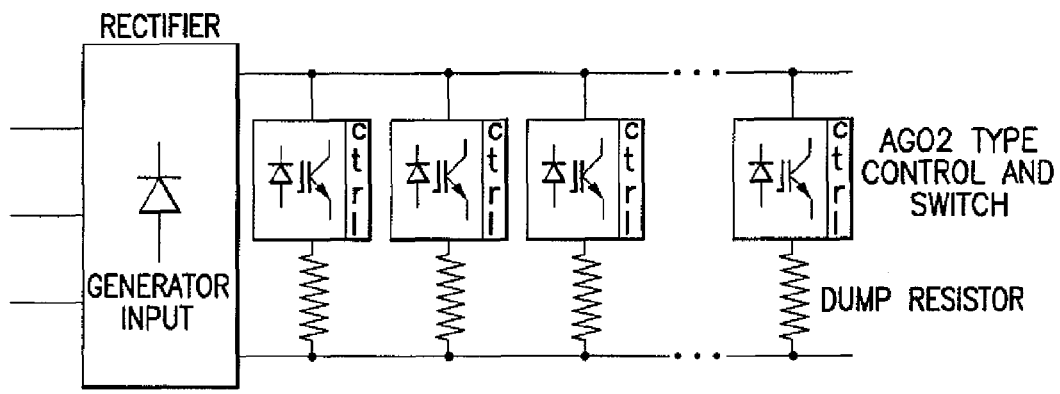
FIG. 5 shows various implementations of the dump load.
Figure 5B:
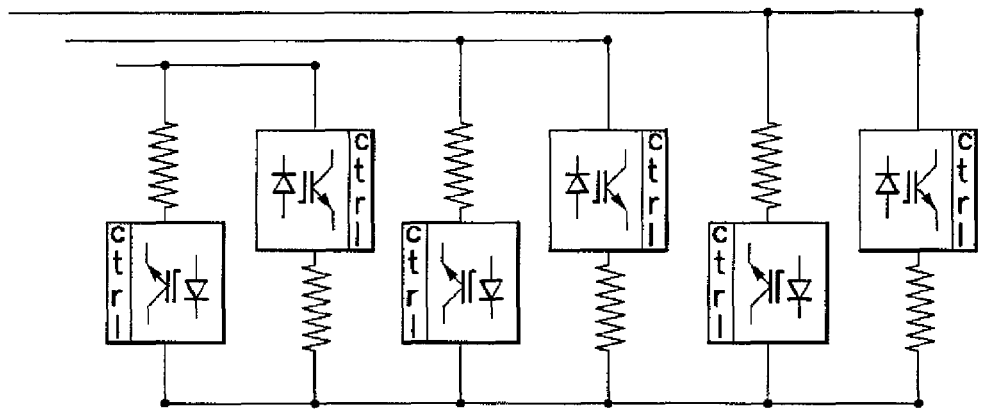
Figure 5C:
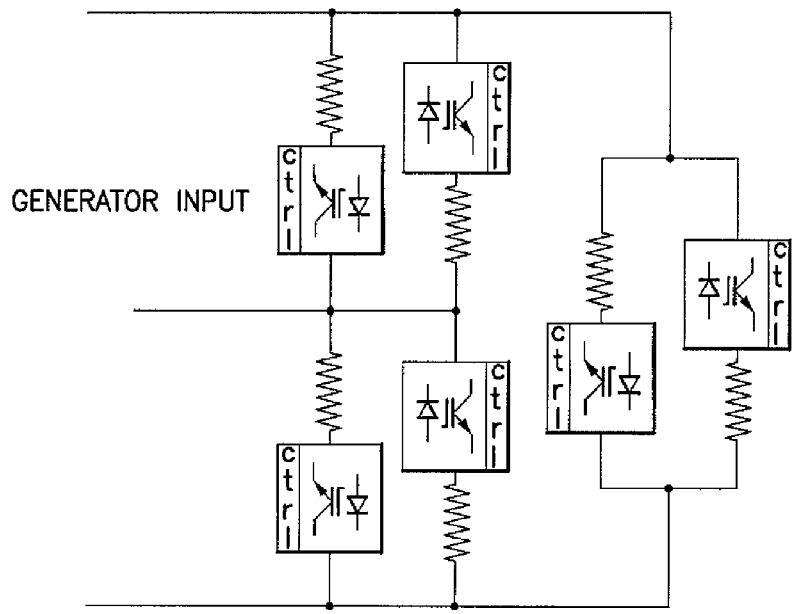

As previously mentioned the power dissipation/storage means may be implemented in various ways. As depicted in FIGS. 5a-5c the power dissipation/storage means, illustrated in the form of a dump load resistor in combination with a crowbar or similar device, may be operatively connected to the intermediate DC circuit of the frequency converter (see FIG. 5a) or directly connected to the generator in a star connection (FIG. 5b) or a delta connection (FIG. 5c). Referring to FIG. 5a a number of parallel coupled and individually controllable power dissipation/storage means are operatively connected to the intermediate DC circuit of the frequency converter. The controllable power dissipation/storage means can be activated individually to comply with specific demands. In FIG. 5b pairs of individually controllable power dissipation/storage means are interconnected to form a star connection operatively connected to the generator (not shown). In FIG. 5c pairs of individually controllable power dissipation/storage means are interconnected to form a delta connection operatively connected to the generator (not shown).

Figure 6:
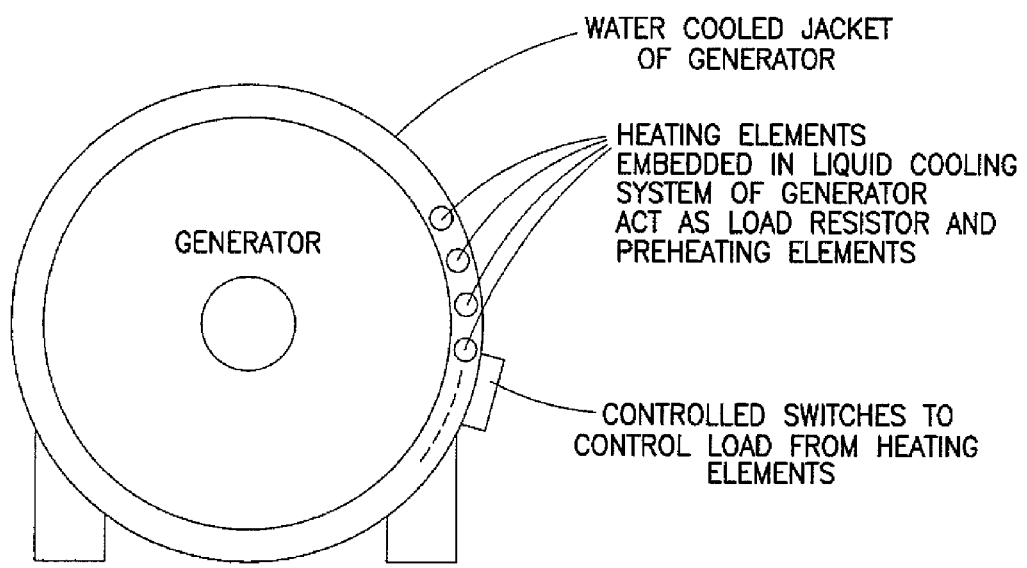
FIG. 6 shows a dump load resistor embedded into a generator jacket.

Mechanically the power dissipation/storage means can be made as separate units, or they can be embedded in the generator cooling system see depicted in FIG. 6. The latter provides direct access to the existing cooling system, and to a large mass that has the capability of "storing" a lot of thermal energy in emergency cases. With the latter implementation, the same system can be used as pre-heater to prepare the wind turbine facility for start-up in cold or humid conditions.

What is claimed is:

1. A wind turbine facility adapted to deliver electrical energy to an associated power supply grid, the wind turbine facility comprising:
   a generator for converting mechanical energy to electrical energy, the generator being mechanically coupled to a set of rotor blades via a gearing arrangement;
   an electric power converter electrically coupled to the generator and the associated power supply grid via a grid transformer;
   power dissipation/storage means being configured to dissipate or store an amount of electrical energy from the generator; and
   a controller that:
      determines a maximum dissipation level or energy storage capacity of the power dissipation/storage means, and
      operates the wind turbine facility such that a total amount of electrical energy generated by the wind turbine facility does not exceed a sum of (i) the maximum dissipation level or energy storage capacity and (ii) an amount of electrical energy to be delivered to the power supply grid.

2. The wind turbine facility according to claim 1, wherein the controller is adapted to determine the maximum dissipation level or energy storage capacity on a regular basis or in response to specific event.

3. The wind turbine facility according to claim 1, wherein the controller is adapted to operate the wind turbine facility such that the total amount of electrical energy generated by the wind turbine facility does not exceed the sum of (i) the maximum dissipation level or energy storage capacity and (ii) the amount to be delivered to the power supply grid upon detecting a grid fault.

4. The wind turbine facility according to claim 3, wherein the controller is adapted to control the total amount of electrical energy generated by the wind turbine facility by activating a pitching system of the wind turbine facility that controls a pitch angle of the rotor blades.

5. The wind turbine facility according to claim 1, further comprising a temperature sensor for determining a temperature of a power dissipation element of the power dissipation/storage means.

6. The wind turbine facility according the claim 5, wherein the controller is adapted to determine the energy storage capacity on the basis of the determined temperature.

7. The wind turbine facility according to claim 1, further comprising a voltage sensor for determining a voltage across a power storage element of the power dissipation/storage means.

8. The wind turbine facility according the claim 7, wherein the controller is adapted to determine the energy storage capacity on the basis of the determined voltage.

9. The wind turbine facility according to claim 1, wherein the power dissipation/storage means comprises a plurality of parallel coupled power dissipation elements and/or power storing elements.

10. The wind turbine facility according to claim 1, wherein the power dissipation/storage means comprises a plurality of parallel coupled power dissipation/storage elements, each power dissipation/storage element comprising a power dissipation element and a power storing element.

11. The wind turbine facility according to claim 1, wherein at least part of the power dissipation/storage means is electrically connected to a node between the generator and the electric power converter via a controllable switch.

12. The wind turbine facility according to claim 1, wherein at least part of the power dissipation/storage means is electrically connected to an intermediate DC circuit of the electric power converter via a controllable switch.

13. The wind turbine facility according to claim 1, wherein the power dissipation/storage means comprises a first part being electrically connected to the generator via a first controllable switch, and a second part being electrically connected to an intermediate DC circuit of the electric power converter via a second controllable switch.

14. The wind turbine facility according to claim 1, wherein the power dissipation/storage means comprises a resistor that dissipates electrical energy.

15. The wind turbine facility according to claim 1, wherein the power dissipation/storage means comprises a capacitor bank that stores electrical energy.

16. A method for operating a wind turbine facility delivering electrical energy to an associated power supply grid during a grid fault, the wind turbine facility comprising power dissipation/storage means that dissipate or store electrical energy exceeding an amount to be delivered to the associated power supply grid during the grid fault, the method comprising:
   operating the wind turbine facility in accordance with an allowed amount of electrical energy that is dissipated or stored in the power dissipation/storage means of the wind turbine facility by ensuring that a total amount of electrical energy generated by the wind turbine facility does not exceed a sum of the allowed amount and the amount to be delivered to the associated power supply grid.

17. The method according to claim 16, wherein the allowed amount of electrical energy is determined from a thermal capacity of a power dissipation element of the power dissipation/storage means.

18. The method according to claim 16, wherein the allowed amount of electrical energy that can be dissipated or stored in the power dissipation/storage means is determined on a regular basis.

19. The method according to claim 16, wherein the allowed amount of electrical energy that can be dissipated or stored in the power dissipation/storage means is determined in response to specific events, such as during grid faults or in periods following such grid faults.

20. The method according to claim 16, further comprising the step of applying electrical energy stored in the power storage means for energising a part of or parts of the wind turbine facility after stoppage of said wind turbine facility.

21. A method for operating a wind turbine facility delivering electrical energy to an associated power supply grid, the wind turbine facility comprising power dissipation/storage means that dissipate or store electrical energy, the method comprising:
   operating the wind turbine facility in accordance with an allowed amount of electrical energy that is dissipated or stored in the power dissipation/storage means of the wind turbine facility by ensuring that a total amount of electrical energy generated by the wind turbine facility does not exceed a sum of the allowed amount of electrical energy and an amount of electrical energy to be delivered to the power supply gird.

22. The method according to claim 21, wherein the allowed amount of electrical energy is determined from a thermal capacity of a power dissipation element of the power dissipation/storage means.

23. The method according to claim 21, wherein the allowed amount of electrical energy that can be dissipated or stored in the power dissipation/storage means is determined on a regular basis.

24. The method according to claim 21, wherein the allowed amount of electrical energy that can be dissipated or stored in the power dissipation/storage means is determined in response to grid faults.

25. The method according to claim 21, further comprising applying electrical energy stored in the power dissipation/storage means for energising a part of or parts of the wind turbine facility after stoppage of said wind turbine facility.

* * * * *